United States Patent [19]

Richard

[11] Patent Number: 5,633,762
[45] Date of Patent: May 27, 1997

[54] DUAL IMAGE MANIFESTATION APPARATUS WITH INTEGRATED ELECTRO-OPTICAL PACKAGE

[75] Inventor: Fred V. Richard, Scottsdale, Ariz.

[73] Assignee: Motorola, Schaumburg, Ill.

[21] Appl. No.: 553,735

[22] Filed: Oct. 23, 1995

[51] Int. Cl.$^6$ .................................................. G02B 7/02
[52] U.S. Cl. ........................ 359/817; 359/811; 385/14; 362/247; 257/81
[58] Field of Search .................... 359/817, 811, 359/798, 799, 800, 801, 809, 810, 247, 254; 385/8, 14; 257/81, 88, 98; 362/247

[56] References Cited

U.S. PATENT DOCUMENTS

| | | | |
|---|---|---|---|
| 5,432,358 | 7/1995 | Nelson, et al. | 257/81 |
| 5,467,215 | 11/1995 | Lebby et al. | 359/247 |
| 5,485,318 | 1/1996 | Lebby et al. | 359/811 |
| 5,543,958 | 8/1996 | Lebby et al. | 359/254 |

*Primary Examiner*—Loha Ben
*Attorney, Agent, or Firm*—Eugene A. Parsons

[57] ABSTRACT

Dual image manifestation apparatus including real image generation component mounted on a mounting structure for providing at least one real image, and an optical magnifier system, including a low magnification optical system supported by the mounting structure and the housing to receive the image at an optical input and provide a magnified image directly viewable at an optical output, and a high magnification optical system integrally formed with the low magnification optical system and supported by the mounting structure and the housing to receive the image at an optical input and provide an enlarged virtual image at an optical output. The apparatus being interchangeable from a low magnification, quasi-direct view image mode to a high magnification, virtual image mode by slideably moving the optical magnifier system so as to position the desired magnification lenses over the real image. Electrical connections for the image generation component are provided through the mounting structure. The apparatus is designed for operation with pagers, cellular telephones, etc.

32 Claims, 3 Drawing Sheets

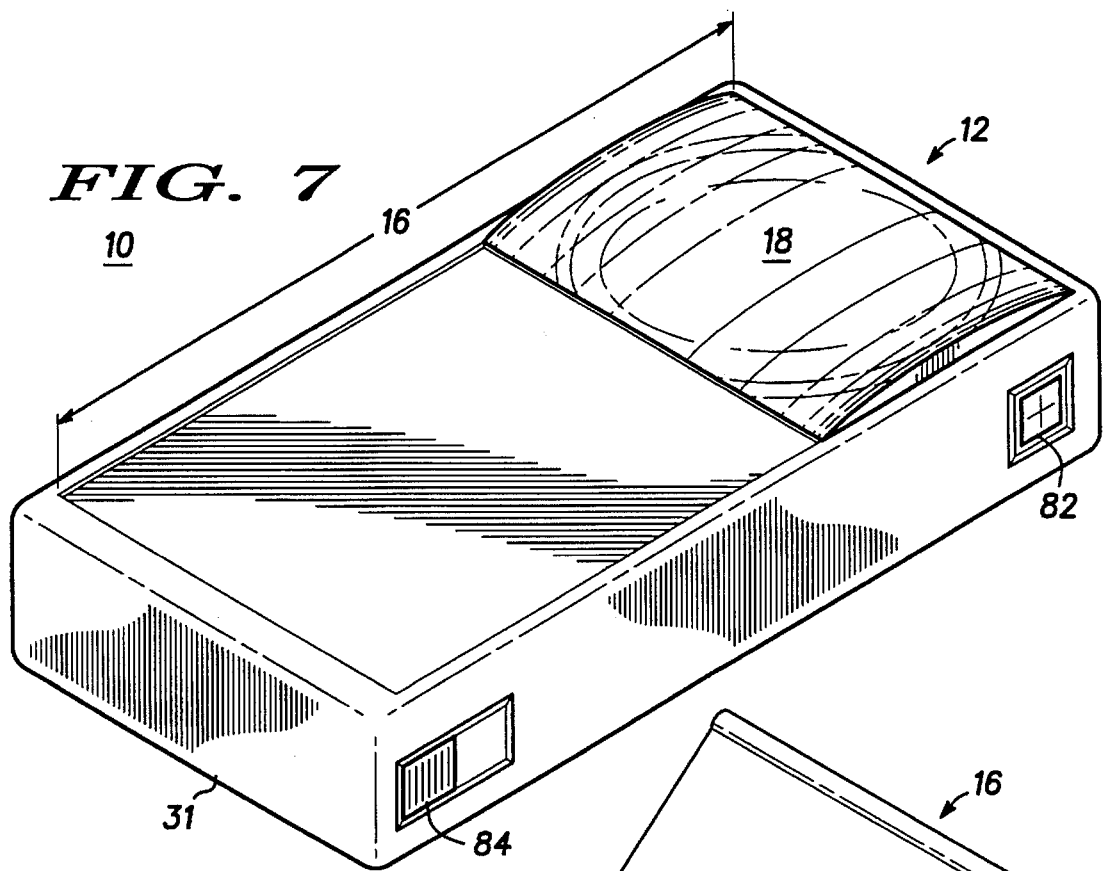
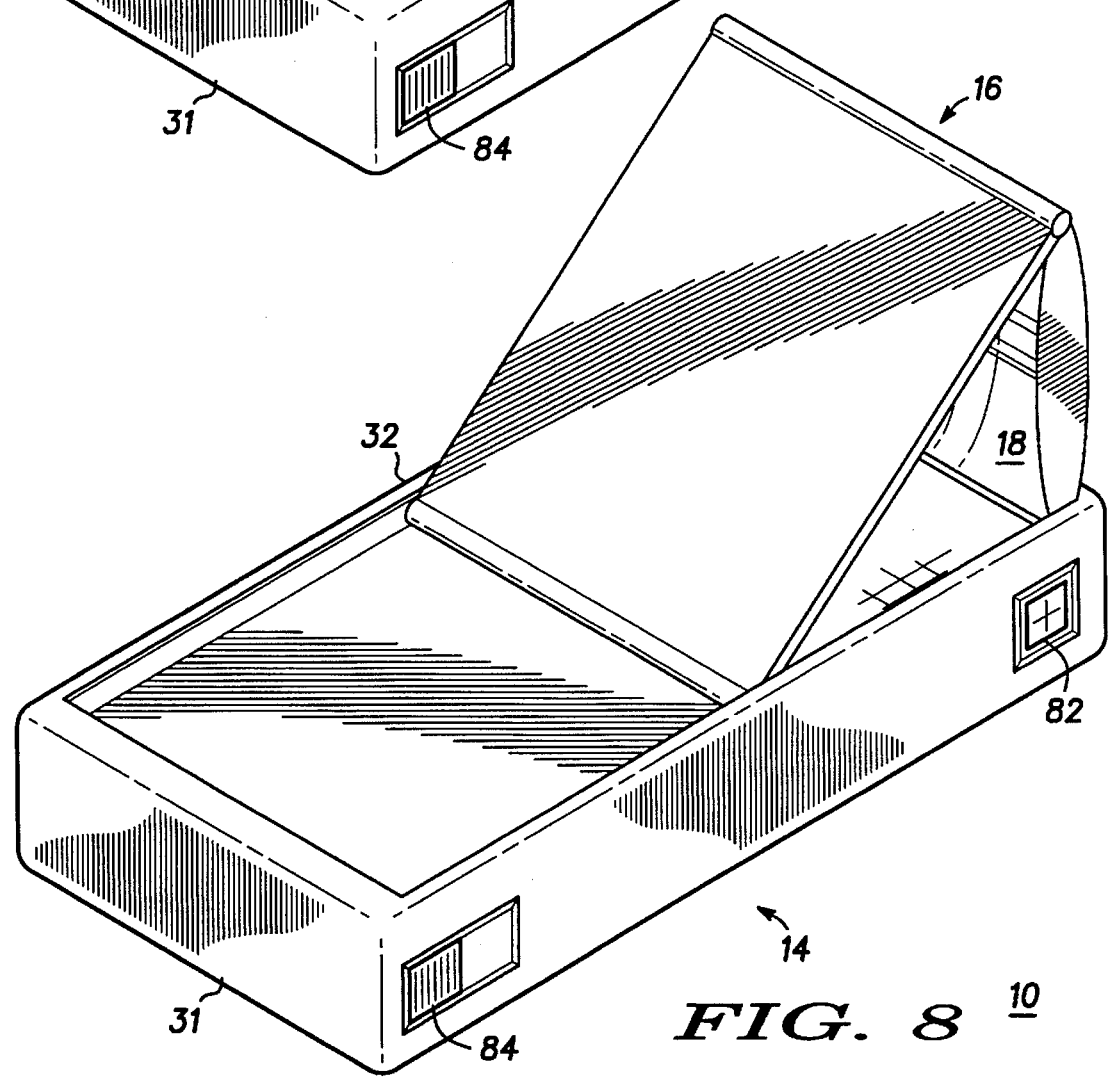

DUAL IMAGE MANIFESTATION APPARATUS WITH INTEGRATED ELECTRO-OPTICAL PACKAGE

FIELD OF THE INVENTION

The present invention pertains to image manifestation apparatus and more particularly to dual image manifestation apparatus formed having an integrated optical package and a dual optical system.

BACKGROUND OF THE INVENTION

With the advent of the communications era, one of the major markets for optical devices is portable electronics equipment, such as cellular telephone, pagers, two-way radios, data banks, computers and the like. Generally, it is desirable that the optical source devices in this type of equipment are compact with low power, inexpensive and include high quality optics. Through the use of digital signals which are being transmitted at ever increasing bandwidths, it is possible to transmit increasingly larger and more complex messages to remote portable units. In some instances it is possible to send complete messages, including alpha-numerics and/or graphics by way of novel pagers. Thus, complete messages can be sent to specific recipients by way of a pager, for example.

Also, in many instances it is desirable to provide a visual display on the communication transceiver to supply the operator with an indication of messages received, numbers actually dialed, and other minor but critical information. The problem is that the visual displays on prior art portable electronics equipment are extremely limited in size and require relatively high electrical power as well as a great amount of area to be sufficiently large to produce a useful display. Thus, while the present visual displays are generally sufficient for displaying the minor information, they are not capable of displaying large alpha-numeric and/or graphic messages.

The system that is normally used at the present time is one using a large image source and either a direct view image or low magnification optics. The major problem with this system is that it greatly limits the size of the portable electronics on which it is used. Basically, the image must be large enough for an operator to read and/or understand the information being displayed. Thus, for example, if one wanted to display an 8.5" by 11" sheet of paper (a standard letter), the direct view display must be 8.5" by 11" to be easily read. Such a display is clearly too large to be incorporated into most portable communications devices, such as pagers, two-way radios, cellular phones and the like.

In the prior art, for example, it is common to provide visual displays utilizing liquid crystal displays, directly viewed light emitting devices, etc. These produce very large and cumbersome displays that greatly increase the size of the transceiver and require relatively large amounts of power. Further, such displays, when used on pagers, greatly limit the amount and, in many instances, the type of messages that can be received.

Some types of devices have been proposed which are capable of displaying larger messages while utilizing a smaller amount of space in the portable electronic device. In one instance, the prior art includes a scanning mirror to produce a visual display but again this requires relatively large amounts of power and is very complicated and sensitive to shock. Also, the scanning mirror causes vibration in the unit that substantially reduces visual comfort and acceptability.

Some attempts have been made to produce displays using arrays of light emitting devices on a single semiconductor chip. Generally, a semiconductor chip, or integrated circuit, is mounted on a printed circuit board or the like and the accepted method for connecting the chip to external circuits is to use standard wire bond technology. However, when a semiconductor chip having a relatively large array of electrical components or devices formed thereon is to be connected, standard wire bond techniques can become very difficult. For example, if a relatively large array (greater than, for example, 10,000 or 100×100) of light emitting devices is formed on a semiconductor chip with a pitch (center-to-center separation) of P, then bond pads on the perimeter of the semiconductor chip will have a 2P pitch. This is true because every other row and every other column goes to an opposite edge of the perimeter to increase the distance between bond pads as much as possible.

At the present time, wire bond interconnects from bond pads having a pitch of 4.8 milli-inches is the best that is feasible. Thus, in the array mentioned above of 100×100 light emitting devices, the bond pads on the perimeter of the semiconductor chip would have a minimum pitch of 4.8 milli-inches, with 50 bond pads situated along each edge of the perimeter. As more devices are included in the array, more bond pads are required and the perimeter size to accommodate the additional bond pads increases at an even greater rate. That is, since the minimum pitch of the bond pads is 4.8 milli-inches, the pitch of the devices in the array can be as large as 2.4 milli-inches, or approximately 61 microns, without effecting the size of the chip. Thus, even if the devices can be fabricated smaller than 61 microns, the minimum pitch of the bonding pads will not allow the perimeter of the chip to be made any smaller. It can quickly be seen that the size of the semiconductor chip is severely limited by the limitations of the wire bonding technology.

Thus, there is a need for an improved dual image manifestation apparatus, interconnect and packaging structures and techniques which can substantially reduce limitations on the size of the image manifestation apparatus and the semiconductor chips used therein. In addition, there is a need for a portable communications device which will allow the user to view a transmitted display in either a quasi-direct view display mode or in a virtual image display mode.

Accordingly, it is a purpose of the present invention to provide new and improved dual image manifestation apparatus with an integrated electro-optic package.

It is another purpose of the present invention to provide a new and improved dual image manifestation apparatus with an integrated electro-optic package in which the apparatus is operational in either a quasi-direct view display mode or in a virtual image display mode by simply aligning the appropriate optical magnifying system.

It is a further purpose of the present invention to provide a new and improved dual image manifestation apparatus with an integrated electro-optic package which is compactly packaged and operational by the user in either a quasi-direct view display mode or a virtual display mode.

It is yet another purpose of the present invention to provide a new and improved dual image manifestation apparatus with an integrated electro-optic package including a quasi-direct view display mode and a large virtual display mode which is relatively easy and inexpensive to fabricate.

It is still another purpose of the present invention to provide new and improved dual image manifestation apparatus operational by the user to receive either a quasi-direct view display or a large virtual display which is fabricated in a single integrated electro-optic package which can be easily incorporated into portable electronic equipment.

It is another purpose of the present invention to provide new and improved communication transceivers with dual image manifestation apparatus and adjustable optic elements allowing the user to view the transmitted image in either a quasi-direct view display mode or a large virtual display mode.

SUMMARY OF THE INVENTION

The above problems and others are at least partially solved and the above purposes and others are realized in a dual image manifestation apparatus with an integrated electro-optical package including a real image generation means for providing at least one real image and a plurality of optical elements, comprised of a low magnification optical system having a first optical element supported on a mounting structure to receive the one real image at an optical input and a second optical element positioned on an exterior aspect of the apparatus to provide a magnified real image quasi-directly viewable at an optical output, and a high magnification optical system having a first optical element supported on the mounting structure, and a second optical element positioned substantially perpendicular to an exterior aspect of the apparatus, integrally formed with the low magnification optical system, and having a light input and light output with at least one reflecting surface optically positioned between the input and the output so as to direct and receive the one real image from an optical input and provide an enlarged virtual image at an optical output. The plurality of optical elements are constructed to angularly magnify an image source at the light input, when viewed in a quasi-direct display mode of less than ten, and when viewed in a virtual image display mode by greater than ten.

Electrical connections for the image generation means are provided through the mounting structure. In the preferred embodiment, the electro-optical package is comprised of an integrated light emitting diode imager (LEDI) chip due to the size constraints of the apparatus and the small package size of the LEDI chip. In alternative embodiments, and dependent on size limitations, the electro-optical package may include a liquid crystal spatial light modulator stack and supporting housing or a liquid crystal spatial light modulator stack incorporating an optically clear portion, thereby forming an optical waveguide for guiding the image from an image generator to the magnifying optical systems.

The above problems and others are substantially solved and the above purposes and others are further realized in a dual image manifestation apparatus including an image generator having a two dimensional array of light emitting devices formed on a single substrate and driver circuits coupled to the light emitting devices and including a data input terminal. The light emitting devices are individually addressable by the driver circuits so as to generate a real image including one of a plurality of lines of alpha-numerics and graphics from data received at the data input.

In its low magnification mode, a slideably moveable dual lens optical magnifier system is positioned in overlying relationship to the image generator so as to receive and magnify the real image, thereby enabling a quasi-direct view image, or a virtual image, to be seen in the output thereof. In high magnification mode, the slideably moveable optical magnifier system has a plurality of optical elements including an first optical lens element positioned in overlying relationship to the image generator, and second optical lens element positioned orthogonally at the optical output and a reflective diffractive surface positioned between the input and the output so as to direct light from the input to the output to create a high magnification virtual image display mode. In the virtual image display mode, the second optical lens element is slideably positioned adjacent the light output of the image generator and the reflective surface so as to receive light from the reflective surface. The plurality of optical elements define a light path from a path input to a path output with at least one biaspheric element formed as one of the plurality of optical elements and positioned in the light path for aberration correction. An additional diffractive optical element may be formed on one of the plurality of optical elements and positioned in the light path so as to provide further aberration correction. The plurality of optical elements are constructed to angularly magnify the real image in quasi-direct view display mode by less than ten and in a high magnification virtual image display mode by greater than ten.

BRIEF DESCRIPTION OF THE DRAWINGS

Referring to the drawings:

FIG. 7 is a perspective view of a portable electronic equipment embodying the present invention, moveable optical magnifier system thereof being in a first position; and FIG. 8 is a perspective view of a portable electronic equipment embodying the present invention, moveable optical magnifier system thereof being in a second position.

DESCRIPTION OF THE PREFERRED EMBODIMENTS

Figure 1:
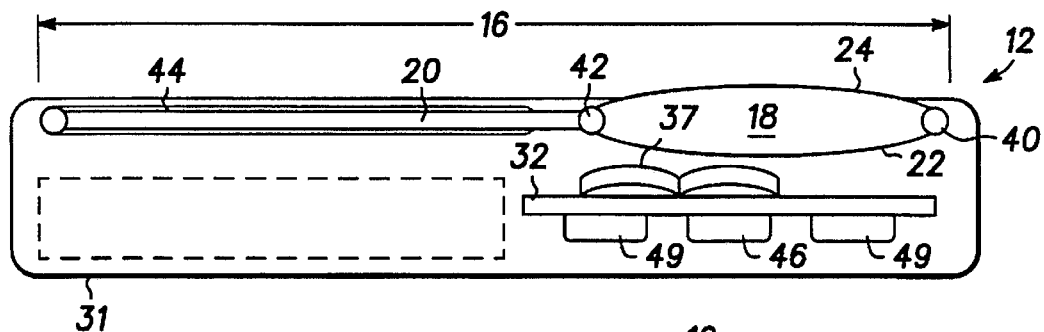
FIG. 1 is a simplified schematic view generally illustrating the embodiment of dual image manifestation apparatus in accordance with the present invention, movable optical magnifier system thereof being in a first position.
Figure 2:
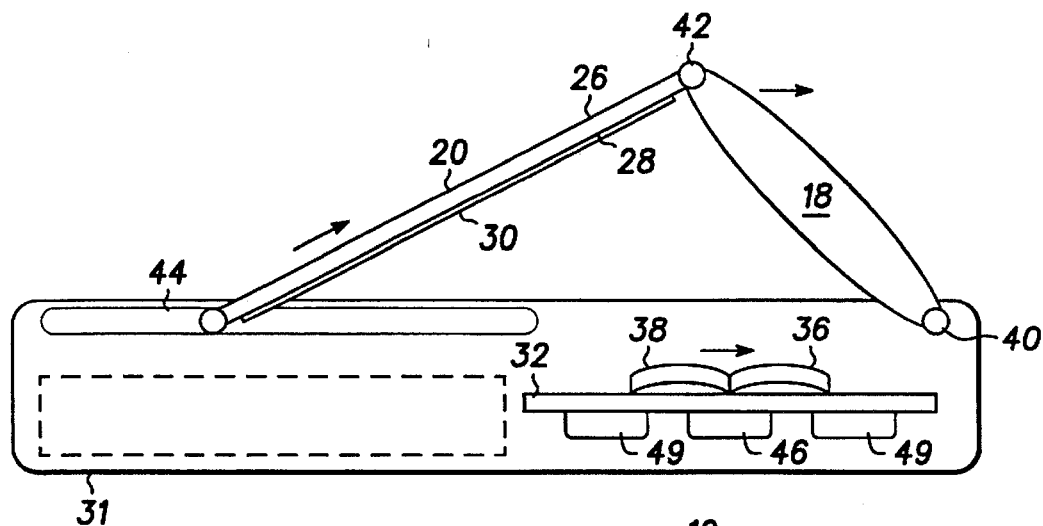
FIG. 2 is a simplified schematic view similar to FIG. 1, with the movable optical magnifier system thereof being in a mid position.
Figure 3:
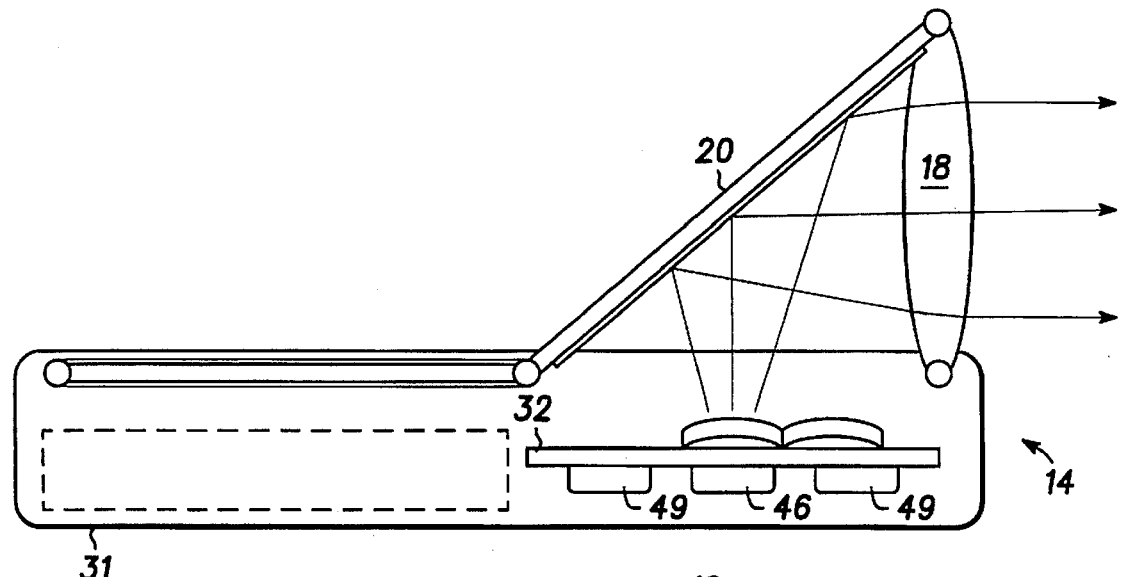
FIG. 3 is a simplified schematic view similar to FIGS. 1 and 2, with the movable optical magnifier system thereof being in a second position.

Referring specifically to FIGS. 1, 2 and 3, simplified schematic views generally illustrating an embodiment of dual image manifestation apparatus, constructed in accordance with the present invention and designated 10, are illustrated. Dual image manifestation apparatus 10 includes a first image manifestation apparatus 12 constructed to provide a quasi-direct view image, illustrated in FIG. 1, and a second image manifestation apparatus 14 constructed to provide a large virtual image, illustrated in FIG. 3. While separate image manifestation apparatus 12 and 14 are referred to herein for purposes of this explanation, it will be understood by those skilled in the art that apparatus 10 essentially has two modes of operation, which may be designated 12 and 14.

Image manifestation apparatus 10, has attached an optical magnifier system 16, comprised of an optical element 18, a planar front member 20, and a field flattener optical lens system 37, which together serve to allow the user to view an image transmitted in a quasi-direct view display when optical system 16 is in a first position (as illustrated in FIG. 1) or as a virtual image display when optical system 16 is in a second position (as illustrated in FIG. 3). Optical element 18 and planar front member 20 are pivotally hinged to allow for movement of optical system 16 to a first planar or flat position, as illustrated in FIG. 1, thereby operational in a first mode for viewing quasi-direct view display, and to allow for movement of optical system 16 to a second generally upright or perpendicular position, as illustrated in FIG. 3, thereby operational in a second mode for viewing virtual image display. It will be understood that optical system 16 may be configured to allow for viewing of virtual image display when optical element 18 is not positioned in a fully erect, perpendicular alignment to apparatus 10.

Optical element 18 is disclosed in the preferred embodiment to be a biaspheric lens. The preferred biaspheric lens is rotationally symmetrical, and truncated in at least two opposed aspects, thus providing a plurality of planar means for hinged attachment to front planar member 20 and a housing 31 for apparatus 10. Optical element 18 is further disclosed as having an interior surface 22 and an exterior surface 24. Optical element 18 has formed on interior surface 22, a diffractive or kinoform surface to allow for chromatic and other aberration correction. In addition, optical element 18 has coated on exterior surface 24, an abrasion resistive coating such as magnesium flouride to prevent abrasions to optical element 18 when storing apparatus 10, such as when placed in a coat pocket, or the like.

As shown in FIG. 2, front planar member 20 is comprised of a substantially rectangular planar component having an outer surface 26 and an inner surface 28 defined thereon. Inner surface 28 has integrally formed therein, or fixedly attached to the surface, a reflective optical element 30 which may, in addition, have an integral diffractive structure for further aberration correction. Optical element 30 is positioned between a light input or image source and a light output so as to direct light from the input to the output element to create a virtual image display mode. Optical lens 18 is positioned adjacent the light output of the reflective surface so as to receive light from the reflective surface. The plurality of optical elements present when viewing the image in virtual image display mode define a light path from a path input to a path output as further illustrated by directional arrows in FIG. 3. The plurality of optical elements are constructed to angularly magnify the real image in an amount greater than ten. This above described positioning of optical elements 18 and 30 permits viewing of the virtual image when optical system 16 is positioned in second position or virtual image display mode.

There is provided within housing 31, mounting structure 32. Mounting structure has slideably mounted thereon a dual field flattener optical element 37. Lens system 37 is comprised of a first optical element 36, for viewing the image in a quasi-direct display mode, and second optical element 38, for viewing the image in virtual image display mode. Lens system 37 is disclosed as comprised of a plurality of convex concave lenses. The major purpose of lens system 37 is to provide a flat image plane and to this end lens system 37 includes a field flattening concave surface, which may also be aspheric to compensate for aberration. Lens system 37 may be formed directly in, or as a portion of, the upper surface of mounting structure 32. It will be understood, however, that lens system 37 is illustrated as a separate component in this embodiment comprised of two convex concave lenses for ease of explanation. Separate components of course result in additional components and assembly steps which can increase cost and size of the final structure. In addition, it will be understood that lens system 37 in an alternative embodiment may be comprised of one convex concave lens or other optical element fixedly attached to mounting structure 32.

Lens system 37 is slideably mounted on mounting structure 32, over the generated image area so as to allow proper positioning of the desired lens, dependent on the mode of operation, either quasi-direct display or virtual image display. Lens system 37 is mounted so as to achieve movement and proper positioning of the first optical element 36 when optical system 16 is positioned in a flat or planar configuration or of second optical element 38 when optical system 16 is positioned in a generally upright configuration. In operation, first optical element 36, for viewing the image in quasi-direct display mode, would be positioned over the generated image when optical system 16 is in a flat or planar position. Similarly, second optical element 38 would be slideably moved and positioned over a generated image when optical system 16 is slideably moved to a generally upright or perpendicular position for viewing the image as a virtual image display. The movement of the optical system 16 to the proper position, in turn slideably moves dual lens system 37, aligning either first optical element 36 or second optical element 38 over the generated image.

Due to the compact dimensions of apparatus 10, optical lens system 37 is extremely thin and may be very difficult to manufacture, especially as a separate component. The function of optical lens system 37 may alternatively be implemented into a plurality of diffractive surfaces. Incorporating diffractive optical elements and aspheric surfaces into various surfaces of the plurality of optical elements is disclosed in co-pending application entitled, "MULTI-FOLD OPTICAL MAGNIFIER FOR USE IN IMAGE MANIFESTATION APPARATUS", Ser. No. 08/415,285, filed Apr. 3, 1995, and assigned to the same assignee. The incorporation of optical functions and aberration correction functions into apparatus 10, occupies essentially no additional volume.

Illustrated in FIG. 1 is image manifestation apparatus 10 having attached moveable optical system 16 positioned in a first mode, thereby allowing the user to view a quasi-direct view display. In operation, moveable optical system 16 is positioned in a flat, planar position for viewing a quasi-direct image displayed through optical element 18. The user would look at the image directly through optical element 18 to view the image generated by an image generator. To view the virtual image display, the user would slideably move front planar member 20 in an upward direction, from the first position, quasi-direct view display, to the second position, virtual image display, as illustrated in FIG. 3. A feature is incorporated into the drive electronics so that when moveable positioning of optical system 16 and dual lens system 37 takes place, a signal is submitted to a controller (discussed presently) to change the display characters from a low resolution, large font, quasi-direct view display to a high resolution, high information content, virtual image display and vice versa dependent on the positioning of optical system 16.

To allow for moveable positioning of optical system 16, there is provided a first means 40 for hingedly attaching optical element 18 at a first truncated end to housing 31. In addition, there is provided a second means 42 for hingedly attaching optical element 18 at an opposed second truncated end to planar front member 20, thereby allowing movement of optical system 18 from a first position to a second position. In the preferred embodiment, the first and second means for hingedly attaching optical element 18, planar front member 20 and housing 31 are disclosed as being linear rotational hinges.

There is provided an integrally formed guidepath 44, formed in an uppermost surface of housing 31. Guidepath 44 allows for a sliding motion of planar front member 20, hingedly affixed to optical element 18, thereby permitting a sliding movement of optical system 16 from first position to second position. This upward sliding motion of optical system 16 is further illustrated through the use of directional arrow, as shown in FIG. 2 in which optical system 16 and lens system 37 are positioned in a mid-state, between the quasi-direct view display mode and the virtual image display mode. It will be understood that optical system 16 when positioned in a direct view display mode, allows for seating of optical element 18 and planar front member 20 within an uppermost surface of housing 31. There is provided means for sealing (not shown) the electronics positioned within the mounting structure 32, from dust or moisture, thus protecting circuits or other components, of which at least some portion is optically clear to allow for passage of the generated image.

FIG. 3 illustrates the previously described sliding of planar front component 20 within guidepath 44 to achieve positioning of optical element 18 in a substantially upright or perpendicular alignment to housing 31. This alignment of lens 18 with housing 31 allows for the viewing of a large virtual image display by the user through optical element 18.

As disclosed, in the preferred embodiment optical element 18 is a biaspheric lens, mounted so as to receive the image from an image generator, magnify it an additional predetermined amount and create an aperture within which a quasi-direct image is viewed. Optical element 18 in conjunction with lens system 37 magnifies the image a total of approximately four times (4×) in a preferred embodiment for viewing a quasi-direct image and approximately fourteen times (14×) for viewing a virtual image.

Image manifestation apparatus 12, constructed to provide a quasi-direct view image, and image manifestation apparatus 14, constructed to provide a virtual image, receive an image from an image generator. As illustrated in FIGS. 1–3, apparatus 10 includes a real image generator 46 affixed in overlying relationship to mounting structure 32 having lens system 37 slideably attached thereto in overlying relationship. Image generator 46 is disclosed in the preferred embodiment as including a support structure comprised of a thin glass plate having a circuit pattern formed thereon, including a semiconductor chip having a large array of light emitting devices formed thereon. Additional information on this type of electro-optical package is available in U.S. Pat. No. 5,432,358 entitled "INTEGRATED ELECTRO-OPTICAL PACKAGE", issued Jul. 11, 1995, which discloses an integrated electro-optical package including a semiconductor chip having a major surface with an array of light emitting devices formed on the major surface at a central portion thereof and cooperating to generate a complete real image.

In image manifestation apparatus 12, because of the much smaller size of the quasi-direct view image, the amount of magnification required is much smaller, i.e. less than approximately 10×. In addition, because the quasi-direct view image is viewed at a larger distance from the eye, more power is required to generate this image, compensating for the effects of ambient light. Also, because the quasi-direct view image on optical element 18 is smaller, any message contained in the quasi-direct view image must be larger in order to be perceived by the operator. Thus, whereas one LED in the array of image generator 46 produces one pixel in a final virtual image (for example), several LEDs in the array of image generator 46 may operate in conjunction to produce one pixel in the quasi-direct view image on optical element 18. This feature can be incorporated into the drive electronics and could be automatically switched or energized when the operator slideably moves optical system 16 from a quasi-direct view mode to a virtual image mode of operation. Because several LEDs produce one pixel, in many instances the higher power requirement may be automatically resolved. If additional power is required in some applications, drive current to the LED array can also be automatically increased in the quasi-direct view mode.

Second image manifestation apparatus 14, or second virtual image display mode of operation, is constructed to provide a virtual image generated by the same image source as the direct view image, and incorporates optical element 30 positioned on interior surface 28 of planar front member 20. Thus, optical element 18 and optical element 30 when pivoted into the mode illustrated in FIG. 3, essentially convert quasi-Direct view image manifestation apparatus 12 into virtual image manifestation apparatus 14. Optical element 18 can also include in addition, a Fresnel lens, or the like, for focusing and/or further magnification if desired.

In operation, and as illustrated by directional arrows in FIG. 3, real image generator 46 in conjunction with optical element 18, projects an image onto optical element 30 which is reflected off of optical element 30, onto optical element 18.

Figure 4:
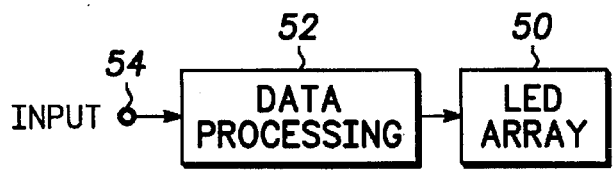
FIG. 4 is a simplified block diagram of electronics associated with the image generator of FIGS. 1–3.
Figure 5:
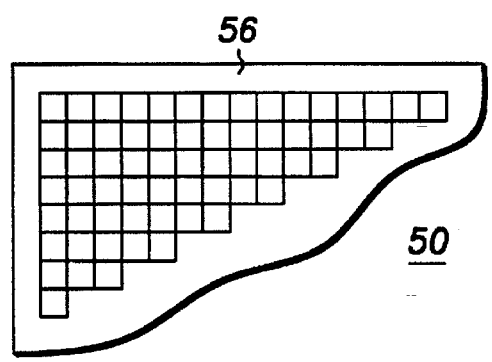
FIG. 5 is an enlarged view in top plan of an LED array, portions thereof broken away, forming a portion of the image generator of FIGS. 1–3.

Real image generator 46 is illustrated in more detail in FIGS. 4 and 5 and includes, for example semiconductor electronics such as a two-dimensional light emitting device (LED) array 50 driven by data processing circuits 52. The array of LEDs can include any of the well known light emitting devices, such as but not limited to light emitting devices (organic or inorganic), electroluminescent devices, vacuum field emission devices, vertical cavity surface emitting lasers, etc. The data processing circuits 52 include, for example, logic and switching circuit arrays for controlling each LED in the LED array. The data processing circuits 52 may include, in addition to or instead of the logic and switching arrays, a microprocessor or similar circuitry for processing input signals 54 to produce a desired real image on a device such as the LED array 50. It will be understood that the data processing circuits 52 and the LED array 50, while illustrated separately for purposes of this description, could be formed on the same semiconductor chip in some applications.

In this specific embodiment the LED array 50 is utilized because of the extremely small size that can be achieved and because of the simplicity of construction and operation. It will of course be understood that other image generating devices may be utilized, including but not limited to lasers, LCDs, FEDs, etc.

Referring specifically to FIG. 5, a plan view of LED array 50 is illustrated in which the LEDs are formed in a regular, addressable pattern of rows and columns on a single substrate or semiconductor chip 56. Portions of chip 56 are broken away to simplify the drawing, but it should be understood that many of the other circuits could be included on the same chip. By addressing specific LEDs by row and column in a well known manner, the specific LEDs are energized to produce a real image. Digital or analog data is received at an input terminal 54 and converted by data processing circuits 52 into signals capable of energizing selected LEDs to generate the predetermined real image.

It will be understood by those skilled in the art that image generator 46 is actually much smaller than illustrated in FIGS. 1–3. Generally, a substrate, e.g. a semiconductor chip, carrying the LED array 50 ranges from approximately 2 centimeters on each side to 1 millimeter on each side and, in a preferred embodiment of the present invention, the size of the array ranges from 1.0 centimeter on a side to 0.1 centimeters on a side. Further, each light emitting device or pixel ranges in size approximately from 50.0 microns to 0.25 micron on a side having a preferred range from 20.0 microns to 0.5 micron. It should be understood that the actual light emitting device array is much smaller, because bonding pads, etc. add several millimeters of area on each side. Generally, the larger size substrates simply mean that more light emitting devices are used in the array to provide more definition, color, etc.

As shown in FIGS. 1–3, a plurality of driver circuits 49 are mounted on a glass substrate, which is mounted to mounting structure 32 by any convenient means, such as bump bonding, wire bonding, etc. so that driver circuits 49 are electrically connected to image generator 46 and to a plurality of external input/output terminals (not shown). Image generator 46 and driver circuits 49 are encapsulated in any well known manner for protection.

As the semiconductor and organic technology reduces the size of the substrate, greater magnification and smaller lens systems are required. Reducing the size of the lenses while increasing the magnification results in greatly limiting the field of view, substantially reducing eye relief and reducing the working distance of the lens system.

Alternative, electro-optical packages are anticipated by this disclosure such as those disclosed in co-pending applications entitled "AN INTEGRATED ELECTRO-OPTIC PACKAGE FOR REFLECTIVE SPATIAL LIGHT MODULATORS", Ser. No. 08/360,504, filed Dec. 21, 1994, and assigned to the same assignee, now U.S. Pat. No. 5,543,958, and co-pending application entitled "AN INTEGRATED ELECTRO-OPTIC PACKAGE FOR REFLECTIVE SPATIAL LIGHT MODULATORS", Ser. No. 08/360, 510, filed Dec. 21, 1994, and assigned to the same assignee, now U.S. Pat. No. 5,467,215. Specifically, disclosed are electro-optical packages incorporating a reflective liquid crystal spatial light modulator (LCSLM) stack and a molded optically clear mounting support. Disclosed are the use of one or more light sources positioned on a lower surface of the mounting support or in the alternative embedded within an optical waveguide formed by the provided mounting support. As disclosed, the light sources can include a single light emitting device (LED) or several LEDs positioned so as to substantially uniformly illuminate the spatial modulator stack. The preferred embodiments is disclosed as comprised of three LEDs (a red, a green and a blue LED in an optically clear support which are alternately activated to form three different light sources, each of which fully and uniformly illuminates the spatial modulator stack at different times. By activating each LCSLM (pixel) in accordance with the amount of each color (red, green, or blue) required in each pixel during the time that that color LED is activated, a complete and full color image is produced for each cycle of the three LEDs. More than one LED of each color can be utilized if more than one is required to provide full and uniform illumination.

The light sources may be embedded in the optically clear support during the molding process and a patterned transparent conductive layer, patterned electrical leads, or imbedded electrical leads are provided on the lower surface of the support to provide electrical connections to the light sources.

A housing, formed of optically clear material, is provided with a plurality of external leads molded into the housing so as to extend into the housing and electrically engage the external terminal ends of the leads and to extend outwardly beyond the outer surface of the housing and form mounting and/or external electrical connections for the integrated electro-optic package.

The housing is formed to receive a diffuser therein, which forms an image plane for light emitted from the stack. It will be understood that diffuser and/or additional optical elements can be mounted in the lower cavity by threaded engagement or by any other convenient means, such as "snap-in" or frictional engagement.

As in the previously disclosed preferred embodiment, a plurality of driver circuits are mounted on the support by any convenient means, such as bump bonding, wire bonding, etc. The driver circuits are electrically connected to image generator 46 and to external input/output terminals. Image generator 46 and any accompanying driver circuits may be encapsulated in any well known manner for protection.

Figure 6:
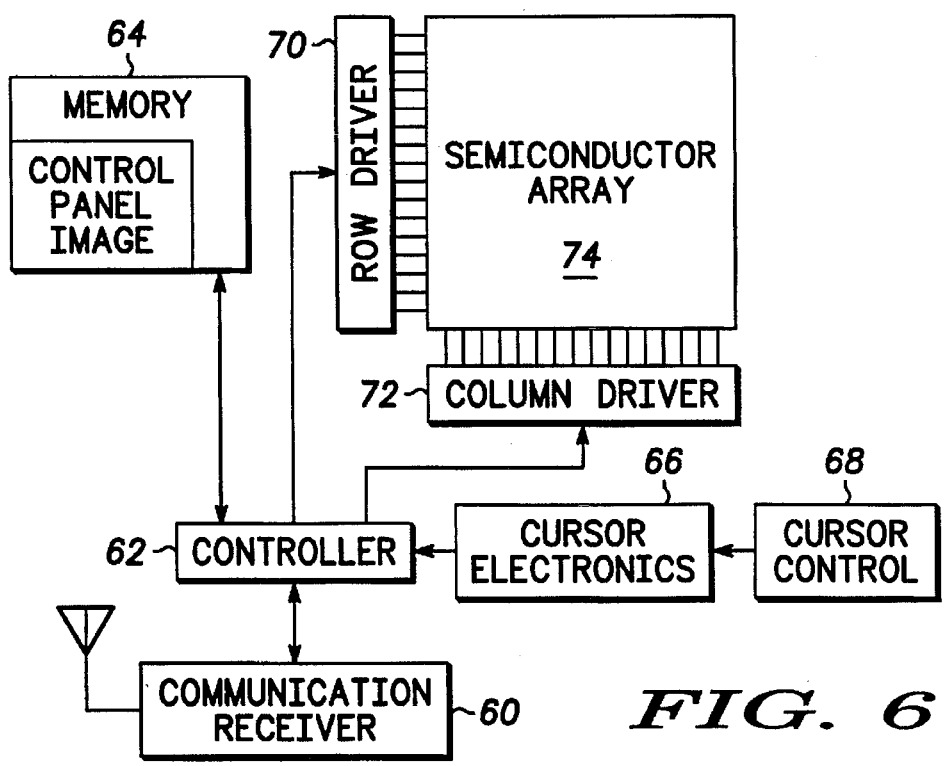
FIG. 6 is a block diagram of electronics for portable electronic equipment embodying the present invention.

Referring specifically to FIG. 6, a block diagram of electronics for communications or other equipment embodying the present invention is illustrated. A communication receiver 60 can be any of the well known portable receivers, such as a cellular or cordless telephone, a two-way radio, a pager, etc. Receiver 60 has a data output connected to a controller 62 which may be a microprocessor, a DSP, a gate array, specially designed logic circuits, etc. A memory 64 is connected to controller 62 and stores information and messages, graphic and/or alpha-numeric, received by receiver 60 in accordance with the programming of controller 62. Cursor electronics 66, driven by cursor controls 68, is also connected to an input or inputs of controller 62.

Controller 62 receives video data from memory 64 and cursor electronics 66 and supplies the video data to row and column drivers 70 and 72 respectively, which in turn activate specific light generating devices in a semiconductor array 74 to produce the desired picture or frame of information. In addition, controller 62 adjusts the video display from a low frequency/low density quasi-direct view image to high frequency/high density virtual image, dependent upon the signal submitted to controller 62 when optical system 16 is aligned and/or re-aligned in a first position or second position. In a specific example, timing signals are supplied to row drivers 70 to supply an activating potential to each complete row, one at a time, and in a periodic sequence from the first row at the top to the last row at the bottom. Simultaneously, a complete row of video data is placed in column drivers 72, which generally include a latching function, and the data is supplied to the row of devices receiving the activating potential from the row drivers 70. When the second row is activated by row drivers 70, a new row of data is switched into array 74 from column drivers 72. In this fashion, a complete real image is generated with the definition and quality depending upon the number of devices included in array 74. Generally, it is desirable to include in the range of 50 to 1500 pixels by 50 to 1500 pixels with each pixel including at least one light emitting device, for purposes of color and/or redundancy.

Referring specifically to FIGS. 7 and 8, perspective views of dual image manifestation apparatus 10 incorporating an integrated electro-optical package is illustrated in typical housing 31. Illustrated in FIG. 7 is first image manifestation apparatus 12 of the present invention, positioned in a first position for viewing an image in quasi-direct image display mode. Optical system 16 is positioned in a substantially planar alignment, thus allowing the user to view the generated image directly through optical element 18.

Illustrated in FIG. 8 is second image manifestation apparatus 14 of the present invention, positioned in a second position for viewing an image in a virtual image display mode. Optical system 16 is positioned in a generally upright position, with optical element 18 positioned substantially perpendicular to housing 31.

In addition, a touch pad 82 is optionally provided on a surface of housing 31 for controlling a cursor in the virtual image, which cursor may further control displayed keyboards and/or other controls. Additional controls 84 are provided on a surface of housing 31 and generally include such features as an on/off switch, and controls for any electronic devices connected thereto.

Generally, for example, control signals titles, etc. will appear in the quasi-direct view image at optical element 18, while larger alpha-numeric messages and graphics will appear in the virtual image at optical element 18

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. Dual image manifestation apparatus with an integrated electro-optical package comprising:

a housing;

real image generation means mounted on a mounting structure, positioned within the housing, for generating at least one real image; and an optical magnifier system comprised of a low magnification optical system positioned to receive the generated real image at an optical input and provide a magnified real image directly viewable at an optical output and a high magnification optical system positioned to receive the generated real image at the optical input and provide an enlarged virtual image at the optical output, the optical magnifier system moveable between a low magnification, quasi-direct view image position, and a high magnification virtual image position.

2. Dual image manifestation apparatus with an integrated electro-optical package as claimed in claim 1 wherein the optical magnifier system is further comprised of a front planar element and an optical lens element, mounted on an uppermost surface of the housing, the optical lens element being hingedly attached thereto and having at least one optical element positioned between the optical input and the optical output.

3. Dual image manifestation apparatus with an integrated electro-optical package as claimed in claim 2 wherein the front planar element is slideably mounted to the housing and having positioned in an underlying relationship thereto, at least one reflective optical element.

4. Dual image manifestation apparatus with an integrated electro-optical package as claimed in claim 2 wherein the optical lens element is a biaspheric lens.

5. Dual image manifestation apparatus with an integrated electro-optical package as claimed in claim 2 wherein the optical magnifier system is slideably adjustable to a first position, quasi-direct view image display, the front planar element and the optical lens element positioned in a substantially planar alignment to the housing, and a second position, virtual image display, the optical lens element positioned in a substantially perpendicular alignment to the housing.

6. Dual image manifestation apparatus with an integrated electro-optical package as claimed in claim 1 wherein the low magnification optical system is further comprised of a field flattener optical lens element positioned in overlying relationship to the generated real image at the optical input and an optical lens element, positioned in overlying relationship to the generated real image at the optical output and the high magnification optical system is further comprised of a field flattener optical lens element positioned in overlying relationship to the generated real image at the optical input, an optical lens element positioned in overlying relationship to the generated real image at the optical output, and at least one reflective optical element, positioned between the optical input and the optical output.

7. Dual image manifestation apparatus with an integrated electro-optical package as claimed in claim 6 wherein the optical magnifier system is moveable between the low magnification optical system and the high magnification optical system.

8. Dual image manifestation apparatus with an integrated electro-optical package as claimed in claim 1 wherein the low magnification optical system magnifies received real images less than approximately 10× and the high magnification optical system magnifies received real images more than approximately 10×.

9. Dual image manifestation apparatus with an integrated electro-optical package as claimed in claim 1 wherein the mounting structure includes optically clear plastic material molded into a desired shape.

10. Dual image manifestation apparatus with an integrated electro-optical package as claimed in claim 1 wherein the real image generation means includes an image generator with a semiconductor chip mounted on the mounting structure, the image generator further including a two dimensional array of light emitting devices formed on the semiconductor chip and cooperating to generate a complete real image, the light emitting devices being positioned in rows and columns to define all pixels of the real image and operably connected to connection/mounting pads adjacent outer edges of a substrate.

11. Dual image manifestation apparatus with an integrated electro-optical package as claimed in claim 10 wherein the image generator further includes a window frame substrate, defining a centrally optically transparent light passage therethrough, substantially coextensive with the semiconductor chip and mounting pads formed on a surface surrounding the central passage.

12. Dual image manifestation apparatus with an integrated electro-optical package as claimed in claim 10 wherein the image generation means further includes a plurality of driver circuits having terminals and connected to the light emitting devices through the terminals and the connection/mounting pads on the outer edges of the substrate.

13. Dual image manifestation apparatus with an integrated electro-optical package as claimed in claim 12 wherein the plurality of driver circuits include at least one integrated circuit mounted on a support structure and the terminals are formed in the support structure and electrically connected to the integrated circuit through leads formed in the support structure.

14. Dual image manifestation apparatus with an integrated electro-optical package as claimed in claim 13 wherein the support structure includes a printed circuit board.

15. Dual image manifestation apparatus with an integrated electro-optical package as claimed in claim 14 wherein the printed circuit board of the support structure is formed of FR4 material.

16. Dual image manifestation apparatus with an integrated electro-optical package as claimed in claim 10 wherein the mounting structure includes plastic material molded into an optical portion and an electrical portion with at least the optical portion being formed of optically clear plastic.

17. Dual image manifestation apparatus with an integrated electro-optical package as claimed in claim 16 wherein the optical portion includes an optical waveguide having an optical input and at least one optical output, with the optical waveguide being positioned to receive the real image from the image generation means and direct the real image to the optical output.

18. Dual image manifestation apparatus with an integrated electro-optical package as claimed in claim 17 wherein the optical waveguide includes optical elements positioned to receive the image and provide magnification.

19. Dual image manifestation apparatus with an integrated electro-optical package as claimed in claim 1 wherein the mounting structure is a glass substrate with a printed circuit structure thereon.

20. Dual image manifestation apparatus with an integrated electro-optical package as claimed in claim 1 including in addition a communications device connected to the real image generation means for supplying video signals to the real image generation means.

21. Dual image manifestation apparatus with an integrated electro-optical package as claimed in claim 1 wherein the real image generation means includes an image generator mounted on the mounting structure with a two dimensional array of light emitting devices formed thereon and cooperating to generate a complete real image, the light emitting devices being positioned in rows and columns to define all pixels of the real image and operably connected to connection/mounting pads adjacent outer edges of the mounting structure, and the real image generation means further includes optics with at least one optical element supported on the mounting structure so that the one real image from the image generator is in communication with the optical element supported on the mounting structure, and an optical lens hingedly attached to the housing.

22. Dual image manifestation apparatus with an integrated electro-optical package comprising:
 a housing;
 a mounting structure encapsulated by the housing;
 real image generation means mounted on the mounting structure for providing at least one real image; and
 a dual mode optical system, operably moveable between a high magnification virtual image display mode and a low magnification quasi-direct view display mode, comprised of a plurality of optical elements, including a slideably moveable front planar member having mounted in underlying relationship thereon a reflective optical element, an attached optical lens element, and at least one field flattener optical element, positioned to receive the real image at an optical input and provide one of a quasi-direct view image directly viewable at an optical output and a virtual image viewable at the optical output.

23. Dual image manifestation apparatus with an integrated electro-optical package as claimed in claim 22 wherein the plurality of optical elements are positioned in overlying relationship to the real image generation means, the front planar member and the attached optical lens element positioned substantially planar to the housing to receive the real image at the optical output, thus providing an aperture for the quasi-direct view image.

24. Dual image manifestation apparatus with an integrated electro-optical package as claimed in claim 23 wherein the plurality of optical elements are positioned in overlying relationship to the real image generation means, the front planar member positioned to allow for alignment of the attached optical lens element in a substantially perpendicular position to the housing to receive the real image at the optical output, thus providing an aperture for viewing the enlarged virtual image.

25. Dual image manifestation apparatus with an integrated electro-optical package as claimed in claim 22 wherein the real image generation means includes an image generator mounted on the mounting structure with a two dimensional array of light emitting devices formed thereon and cooperating to generate a complete real image, the light emitting devices being positioned in rows and columns to define all pixels of the real image and operably connected to connection/mounting pads adjacent outer edges of the mounting structure.

26. Dual image manifestation apparatus with an integrated electro-optical package as claimed in claim 22 wherein the real image generation means includes an optical waveguide affixed to the mounting structure and having an optical input and an optical output, with the optical waveguide being positioned to receive the real image from the image generation means and direct the real image to the optical output.

27. Dual image manifestation apparatus with an integrated electro-optical package as claimed in claim 26 wherein the optical waveguide includes optical elements positioned to receive the image and provide magnification.

28. Dual image manifestation apparatus with an integrated electro-optical package comprising:
 a housing;
 a mounting structure positioned within the housing, including a plurality of terminals and mounting pads;
 an image generator mounted on the mounting structure with a two dimensional array of light emitting devices formed thereon and cooperating to generate a complete real image, the light emitting devices being positioned in rows and columns to define all pixels of the real image and operably connected to connection/mounting pads adjacent outer edges of the image generator, the connection/mounting pads being physically and electrically attached to the terminals and mounting pads of the mounting structure;
 a plurality of driver circuits mounted on the mounting structure and connected to the light emitting devices of the image generator through the terminals and mounting pads on the mounting structure;
 a quasi-direct view image manifestation apparatus including at least one lens system positioned in overlying relationship to the mounting structure and the image generator, a slideably moveable front planar member and an attached optical element mounted to the front planar member and the housing, positioned substantially planar to the housing, to receive and magnify the real image and produce an easily viewable quasi-direct view; and
 a virtual image manifestation apparatus including at least one lens system positioned in overlying relationship to the mounting structure and the image generator, the slideably mounted front planar member further comprising an optical element positioned in underlying relationship to the front planar member, and the optical element mounted to the front planar member and the housing, positioned substantially perpendicular to the housing, to receive and magnify the real image and produce an easily viewable virtual image.

29. Dual image manifestation apparatus with an integrated electro-optical package as claimed in claim 28 wherein the quasi-direct view image manifestation apparatus and the virtual image manifestation apparatus are moveable relative to the housing and the real image generator for viewing the real image in either a quasi-direct view display mode or a virtual image display mode.

30. A method of fabricating dual image manifestation apparatus with an integrated electro-optical package comprising the steps of:

providing a housing;

providing a mounting structure positioned within the housing;

forming real image generation means for providing at least one real image, and mounting the real image generation means on the mounting structure; and supporting an optical system operably moveable between a high magnification virtual image display mode and a low magnification quasi-direct view display mode, comprised of a plurality of optical elements positioned relative to the mounting structure and the housing so as to receive the one real image at an optical input and provide one of a magnified real image directly viewable at an optical output and an enlarged virtual image viewable at the optical output dependent upon the mode of operation.

31. A method of fabricating dual image manifestation apparatus with an integrated electro-optical package as claimed in claim 30 wherein the step of providing a mounting structure includes molding optically clear plastic material into a desired shape.

32. A method of fabricating dual image manifestation apparatus with an integrated electro-optical package as claimed in claim 31 wherein the step of providing a mounting structure includes molding optical elements into the mounting structure.

* * * * *